US011361758B2

(12) United States Patent
Baker

(10) Patent No.: US 11,361,758 B2
(45) Date of Patent: Jun. 14, 2022

(54) MULTI-STAGE MACHINE LEARNING AND RECOGNITION

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 16/605,463

(22) PCT Filed: Apr. 16, 2018

(86) PCT No.: PCT/US2018/027744
§ 371 (c)(1),
(2) Date: Oct. 15, 2019

(87) PCT Pub. No.: WO2018/194960
PCT Pub. Date: Oct. 25, 2018

(65) Prior Publication Data
US 2020/0051550 A1    Feb. 13, 2020

Related U.S. Application Data

(60) Provisional application No. 62/486,650, filed on Apr. 18, 2017.

(51) Int. Cl.
*G06N 3/04*    (2006.01)
*G06N 3/08*    (2006.01)
(Continued)

(52) U.S. Cl.
CPC ............ *G10L 15/16* (2013.01); *G06N 3/0454* (2013.01); *G06N 3/084* (2013.01); *G10L 15/02* (2013.01);
(Continued)

(58) Field of Classification Search
None
See application file for complete search history.

(56) References Cited

U.S. PATENT DOCUMENTS

2002/0128834 A1    9/2002  Fain et al.
2003/0024993 A1*   2/2003  Gould ................... G07F 7/1008
                                                        235/492
(Continued)

FOREIGN PATENT DOCUMENTS

WO         2018194960 A1    10/2018

OTHER PUBLICATIONS

Pal, Mahesh, and Paul M. Mather. "Decision tree based classification of remotely sensed data." 22nd Asian conference on remote Sensing. vol. 5. Asian Association on Remote Sensing Singapore, 2001. (Year: 2001).*

(Continued)

*Primary Examiner* — Daniel T Pellett
(74) *Attorney, Agent, or Firm* — K&L Gates LLP

(57) ABSTRACT

A multi-stage machine learning and recognition system comprises multiple individual machine learning systems arranged in multiple stages, where data is passed from a machine learning system in one stage to one or more machine learning systems in a subsequent, higher-level stage of the structure according to the logic of the machine learning system. The multi-stage machine learning system can be arranged in a final stage and one or more non-final stages, where the one or more non-final stages direct data generally towards a selected one or more machine learning systems within the final stage, but less than all of the machine learning systems in the final stage. The multi-stage machine learning system can additionally include a learning coach and data management system, which is configured to control the distribution of data throughout the multi-stage structure of machine learning systems by observing the internal state of the structure.

29 Claims, 7 Drawing Sheets

(51) Int. Cl.
*G10L 15/16* (2006.01)
*G10L 15/02* (2006.01)
*G10L 15/22* (2006.01)
*G10L 25/18* (2013.01)

(52) U.S. Cl.
CPC .............. *G10L 15/22* (2013.01); *G10L 25/18* (2013.01); *G10L 2015/025* (2013.01)

(56) References Cited

U.S. PATENT DOCUMENTS

| | | | |
|---|---|---|---|
| 2003/0040904 A1 | 2/2003 | Whiteman et al. | |
| 2004/0088163 A1* | 5/2004 | Schalkwyk | G10L 15/187 704/251 |
| 2010/0166320 A1 | 7/2010 | Paquier | |
| 2011/0075851 A1* | 3/2011 | LeBoeuf | H04R 29/00 381/56 |
| 2014/0149112 A1* | 5/2014 | Kalinli-Akbacak | G10L 15/04 704/232 |
| 2016/0275374 A1 | 9/2016 | Zhu et al. | |
| 2016/0275375 A1* | 9/2016 | Kant | G06K 9/6218 |
| 2017/0024644 A1* | 1/2017 | Van Der Made | G06N 3/063 |

OTHER PUBLICATIONS

Polikar, Robi. "Ensemble learning." Ensemble machine learning. Springer, Boston, MA, 2012. 1-34. (Year: 2012).*
Caruana, Rich, et al. "Ensemble selection from libraries of models." Proceedings of the twenty-first international conference on Machine learning. 2004. (Year: 2004).*
Ko, Albert HR, Robert Sabourin, and Alceu Souza Britto Jr. "From dynamic classifier selection to dynamic ensemble selection." Pattern recognition 41.5 (2008): 1718-1731. (Year: 2008).*
Kang, Sanggil, and Can Isik. "Partially connected feedforward neural networks structured by input types." IEEE transactions on neural networks 16.1 (2005): 175-184. (Year: 2005).*
Yan, Yan, et al. "Sorting-based dynamic classifier ensemble selection." 2013 12th International Conference on Document Analysis and Recognition. IEEE, 2013. (Year: 2013).*
Masci, Jonathan, et al. "Stacked convolutional auto-encoders for hierarchical feature extraction." International conference on artificial neural networks. Springer, Berlin, Heidelberg, 2011. (Year: 2011).*
International Search Report and Written Opinion for International PCT Application No. PCT/US2018/02//44, dated Jul. 3, 2018.
Sermanet et al., Pedestrian detection with unsupervised multi-stage feature learning, 26th IEEE Conference on Computer Vision and Pattern Recognition, CVPR, Portland, Oregon (Jun. 23-28, 2013), 3626-3633.
Trapeznikov et al., Multi-stage classifier design, Machine Learning (Sep. 2013), 92(2-3):479-502.

* cited by examiner

MULTI-STAGE MACHINE LEARNING AND RECOGNITION

PRIORITY CLAIM

The present application is a National Stage application of International Application Serial No. PCT/US2018/027744, titled MULTI-STAGE MACHINE LEARNING AND RECOGNITION, filed Apr. 16, 2018, which claims priority to U.S. provisional patent application Ser. No. 62/486,650, titled MULTI-STAGE MACHINE LEARNING AND RECOGNITION, filed Apr. 18, 2017, each of which is incorporated herein by reference in its entirety.

BACKGROUND

Machine learning is a process implemented by computers to self-learn algorithms that can make predictions on data through building models from sample data inputs. There are many types of machine learning system types, such as artificial neural networks (ANNs), decision trees, support vector machines (SVMs), and others. These systems first have to be trained on some of the sample inputs before making meaningful predictions with new data. For example, an ANN typically consists of multiple layers of neurons. Each neuron is connected with many others, and links can be enforcing or inhibitory in their effect on the activation state of connected neurons. Each individual neural unit may have a summation function which combines the values of all its inputs together. There may be a threshold function or limiting function on each connection and on the neuron itself, such that the signal must surpass the limit before propagating to other neurons. The weight for each respective input to a node can be trained by back propagation of the partial derivative of an error cost function, with the estimates being accumulated over the training data samples. A large, complex ANN can have millions of connections between nodes, and the weight for each connection has to be learned.

SUMMARY

In one general aspect, the present invention is directed to a multi-stage machine learning and recognition system. The multi-stage machine learning system can include multiple individual machine learning systems arranged in multiple stages, wherein data is passed from a machine learning system in one stage to one or more machine learning systems in a subsequent, higher-level stage of the structure according to the logic of the machine learning system. The multi-stage machine learning system can be arranged, for example, in a final stage and one or more non-final stages, where the one or more non-final stages direct data generally towards a selected one or more machine learning systems within the final stage, but less than all of the machine learning systems in the final stage. In various embodiments, the multi-stage machine learning and recognition system of the present invention is relatively computationally efficient as compared to other machine learning networks because only a small fraction of the late stage machine learning systems are selected by the early stage machine learning systems to receive a copy of each item of data received by the system. This prevents the computational power necessary to process a set of data from rising exponentially relative to the amount of data.

The multi-stage machine learning system can additionally include a separate machine learning system designated as a learning coach and data management system, which is configured to control the distribution of data throughout the multi-stage structure of machine learning systems by observing the internal state of the structure. The learning coach and data management system can additionally optimize the performance of the overall system by controlling one or more of the hyperparameters of any of the machine learning systems in the overall system, reorganizing the multi-stage structure, or perform other functions.

The learning coach and data management system can operate in parallel with the multi-stage structure of machine learning systems by controlling the number of final stage destinations for the data both during training and during operation. The learning coach and data management system can dictate the number of final stage destinations according to a hyperparameter weighting the balance between robustness and computational efficiency, as more destinations during training may produce more robust models, but require more computation. The learning coach and data management system can also use its capability to test on separate data and to optimize cost-performance.

The multi-stage machine learning and recognition system of the present invention can be utilized in a variety of different contexts, including image processing and speech recognition. In these or other contexts, each non-final stage machine learning system can function as a classifier selecting which of the machine learning systems in the subsequent stage is to receive each item of data. In such embodiments, each classifier in a non-final stage is tasked with assigning a data item to the classifier or set of classifiers that are members of the set of machine learning systems in the subsequent, higher-level stage of the structure that are most likely to classify the data item correctly. The classifiers within the multi-stage structure can be trained for consistency, for example.

In an embodiment of the multi-stage machine learning and recognition structure configured for speech recognition, the final stage machine learning systems within the structure can be configured to separately attempt to predict the next word from the preceding context, or the preceding word from the following context. In such embodiments, the final stage machine learning system(s) that receives a data item can be determined by the machine learning systems in preceding layers of the structure, just as described above.

The machine learning systems within the overall structure can be any combination of types of machine learning systems, such as decision trees, support vector machines, or deep neural networks. In other words, the structure of machine learning systems is not limited to a particular type of machine learning system and either the stages as a whole or the individual systems within each stage can be alternative types of machine learning systems, without limitation.

These and other benefits of the present invention are apparent from the description herein.

BRIEF DESCRIPTION OF THE DRAWINGS

Various embodiments of the present invention are described herein by way of example in connection with the following figures, wherein.

DETAILED DESCRIPTION

Figure 1:
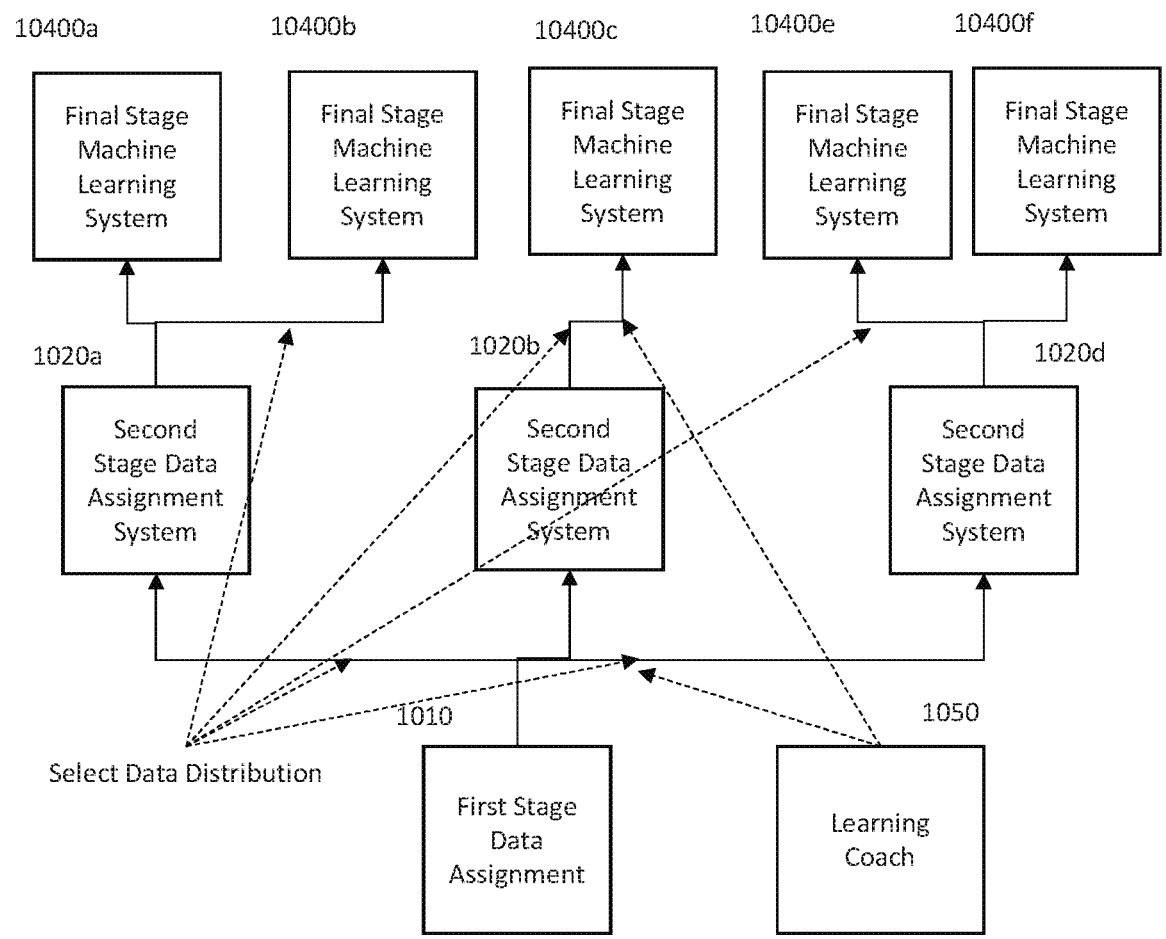
FIG. 1 is a block diagram of a multi-stage machine learning system according to various embodiments of the present disclosure.

FIG. 1 illustrates one embodiment of a multi-stage machine learning system according to the present invention. The multi-stage system includes a network of machine learning systems arranged into a series of sequential stages, wherein a prior stage feeds data into a subsequent stage until a final stage is reached. Each of the units making up each stage can be a distinct machine learning system. Three stages are illustrated in FIG. 1, including a first non-final stage 101, a second non-final stage 102, and a final stage 104; however, the depicted multi-stage system is simply intended to be illustrative and any number, i.e., one or more, of non-final stages may be used. In the embodiment illustrated in FIG. 1, the first stage non-final stage is made up of a single unit 101a, the second non-final stage is made up of three units 102a-c, and the final stage is made up of five units 104a-e; however, the depicted multi-stage system is simply intended to be illustrative and each stage can include any number, i.e., one or more, of such machine learning units.

In an illustrative embodiment of the multi-stage system, each non-final stage machine learning system functions as a classifier selecting which of the machine learning systems in the next stage is to receive each item of data. The final classification decision is made by the one or more classifiers 104a-e in the final stage 104 that are selected by the non-final stages 101, 102. Except for the final stage 104, the task of all the other stages 101, 102 is merely to make the data distribution selection decision. These stages may use classification categories different from the final classification. They may be designed and trained, for example, to optimize some other objective, such as cost-performance trade-off, rather than performance alone. This system architecture can be used both in training of the systems and during operation, whether or not training continues during operation.

The learning coach and data management system 105 is a machine learning system, which is separate from the non-final and final stages 101, 102, 104. The learning coach and data management system 105 learns to control the potential distribution of each item of data to multiple destinations by observing the internal state of the non-final and final stages 101, 102, 104 and the data the non-final and final stages 102, 104 receive. More details about such a learning coach are described in further detail in: (i) U.S. provisional patent Application Ser. No. 62/476,280; (ii) PCT application PCT/US18/20887; and (iii) PCT/US17/52037, all of which are entitled "Learning Coach for Machine Learning System" and all of which are incorporated herein by reference in their entirety.

The learning coach 105 may also have other functions. For example, it may optimize a criterion that takes into account other objectives in addition to performance as measured on training data, such as cost and estimated performance on future operational data. For example, learning coach 105 may cause some data items to be sent to multiple destinations to increase robustness and redundancy. Learning coach 105 may adjust the training hyperparameters for the machine learning systems 101, 102, and/or 104 to enhance speed of the learning process or the accuracy of the convergence of the training. Hyperparameters are control parameters that tune the learning process of the system to work better on the kind of data for a particular task and are generally set by the system operator; however, the learning coach 105 can be configured to alter the hyperparameters of the system as described in the incorporated applications referenced above. Learning coach 105 may add or delete elements in the architecture of machine learning systems 101, 102, and/or 104, or make other changes to their architectures. Learning coach 105 may also optimize some combined measure of cost-performance. For example, it may evaluate the performance on data that has been set aside and not included in training. Learning coach 105 may learn to do these tasks by observing the results of such actions while coaching other multi-stage classification systems like the one shown in FIG. 1, using standard machine learning techniques. Learning coach 105 does not need to be the same type of machine learning system as machine learning systems 101, 102, or 104 (i.e., does not need to have the same machine learning structure). It may be any type of machine system. For example, by way of illustration, the learning coach 105 may be a deep feed forward neural network, while machine learning systems 101, 102, and 104 may also be deep learning networks or may be some other form of machine learning system.

Learning coach 105 may evaluate the performance of the machine learning systems 101, 102, and 104 on separate data that has been set aside from the training data. In one illustrative embodiment, some data is set aside for final validation testing, which is a best practice that is known to those skilled in the art of machine learning. In addition, in this illustrative embodiment, some data that is separate from both the training data and the final validation data is set aside for use by the learning coach 105. With this set aside data, the learning coach can evaluate the performance of machine learning systems 101, 102, and 104 based on criteria other than their training objective evaluated on training data. For example, learning coach 105 can test whether the subject machine learning system 101, 102, or 104 is over-fitting or under-fitting the training data and can change hyperparameters associated with regularization, or take other appropriate action. As another example, learning coach 105 can change the architecture of the subject machine learning system 101, 102, or 104 to optimize some combined measure of cost and performance rather than performance alone. Furthermore, the performance can be evaluated on data that is separate from the training data.

In addition to facilitating the learning process for machine learning systems 101, 102, and 104, learning coach and data management system 105 can also help control the distribution of data between the stages, both during training and during operation. In particular, for each input data item, learning coach and data management system 105 can control the number of final machine learning system destinations for each data item. More destinations during training may produce more robust models, but require more computation. Learning coach 105 can control the number of destinations as a training hyperparameter and also use its capability to test on separate data and to optimize cost-performance.

Although hyperparameters are usually associated with training rather than operation, learning coach 105 can also control the number of final machine learning system destinations during operation. The learning coach 105 can control the number of destinations to be the same in operation as in training, or it can adjust the number separately to optimize the cost-performance trade-off for operational use. These and other aspects of the learning coach and data management system 105 will be discussed in more detail in association with the illustrative examples.

The individual machine learning systems 101, 102, 104 may be any type of machine learning system. There may even be different types of machine learning systems within each stage. One key to efficiency is that the early stages of the multi-stage system select only a small fraction of the later stage systems to receive a copy of each item of data, both during training and during operation.

For example, there may be a thousand, or even a million, final stage machine learning systems 104a-e within the final stage 104. Each data item is distributed to only a very small fraction off all the final machine learning systems 104, perhaps only one out of millions. In the learning phase and in the testing or operational phase, the amount of computation done in a machine learning system tends to grow at least proportional to the amount of data to be analyzed. In fact, because the complexity of a machine learning system designed for state-of-the-art performance also tends to grow with the amount of training data, the amount of computation may tend to grow proportional to the square of the amount of training data. In selecting only one, or a small number, out of millions of final stage machine learning systems 104, the illustrative embodiment can improve the computational efficiency of the overall process by a very large factor.

Figure 2:
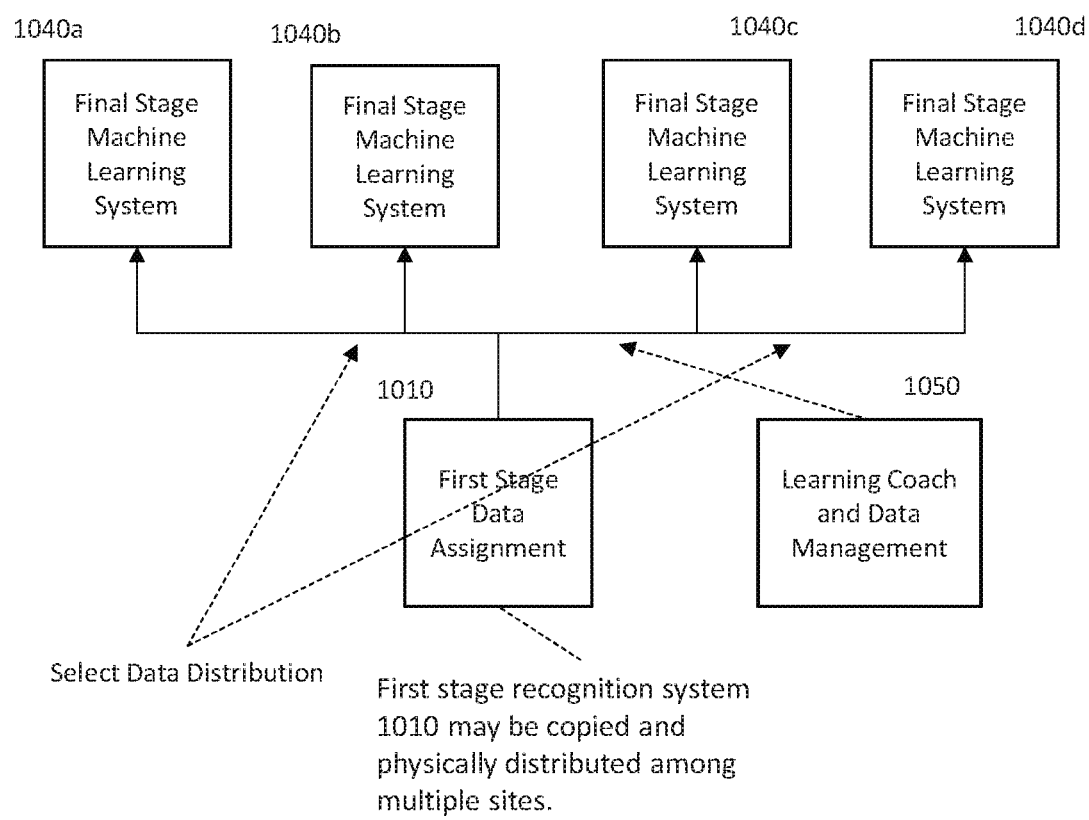
FIG. 2 is a block diagram of a multi-stage machine learning system according to various embodiments of the present disclosure.

FIG. 2 is similar to FIG. 1, except there is only one non-final stage. The architecture illustrated in FIG. 2 may be used when the first stage classifier 101 has a large number of output categories. More specifically, the architecture in FIG. 2 may be used when the number of output categories of the first stage data assignment system 101 is equal to the desired number of final stage machine learning systems 104. The simpler embodiment used in FIG. 2 will be discussed as the first phase of the following illustrative example.

Illustrative Example: Massive Scale Distributed Image Classification. Machine learning has made progress in image classification and object recognition in recent years. Deep neural networks, for example, have been able to approach or exceed human performance in several benchmark testbeds with up to a million images. However, it has been estimated that there are already several trillion images on the web, with nearly a trillion more being added each year. The illustrative embodiment of the invention discussed in this example addresses the problem of classification of such massive quantities of data.

Figure 4:
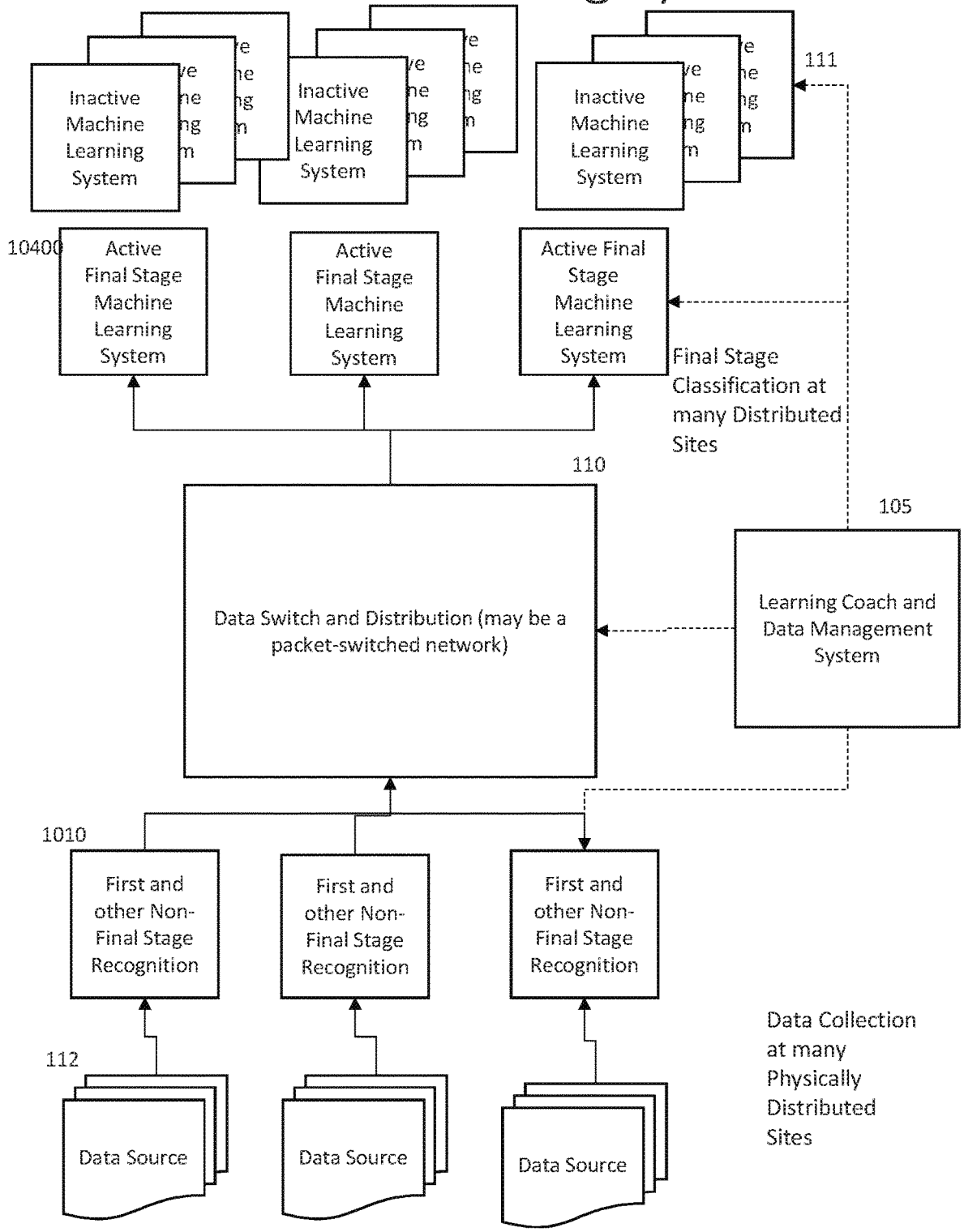
FIG. 4 is a block diagram of a distributed machine learning system according to various embodiments of the present disclosure.

To simplify the discussion, an illustrative, non-limiting example will be discussed in reference to the architecture illustrated in FIG. 2. However, it is to be understood that, in some embodiments, the first stage assignment system 101, may be copied and distributed among many physically separated computing systems as illustrated in FIG. 4, which will be discussed later. For purpose of discussion, the illustrative example will be described in terms of a first stage data assignment system that selects one and only one destination for each input data item. It is to be understood, however, that in other embodiments, first stage data assignment system 101 may select any number of destinations. In any case, learning coach 105 may control a hyperparameter that specifies additional destinations.

To classify an arbitrarily large number of images, the first stage data assignment system 101 in FIG. 2 distributes the images to an arbitrarily large number of final stage machine learning systems 104 (but distributes each image to less than all of the final stage machine learning systems 104). The task of the data assignment system is to select which machine learning system is to receive each item of data. The first stage data assignment system 101 can do this data assignment task both while the machine learning systems 104 are being trained and also during operation after they have been trained. The first stage data assignment system 101 may use the same procedure for assigning data while machine learning systems 104 are being trained as during operational use. Thus, in an embodiment in which data assignment system 101 has already been fully trained, an input data item that occurs during operation that is identical to an item during training of the machine learning systems 104 can be assigned the same way during operation as during training of systems 104.

Figure 3:
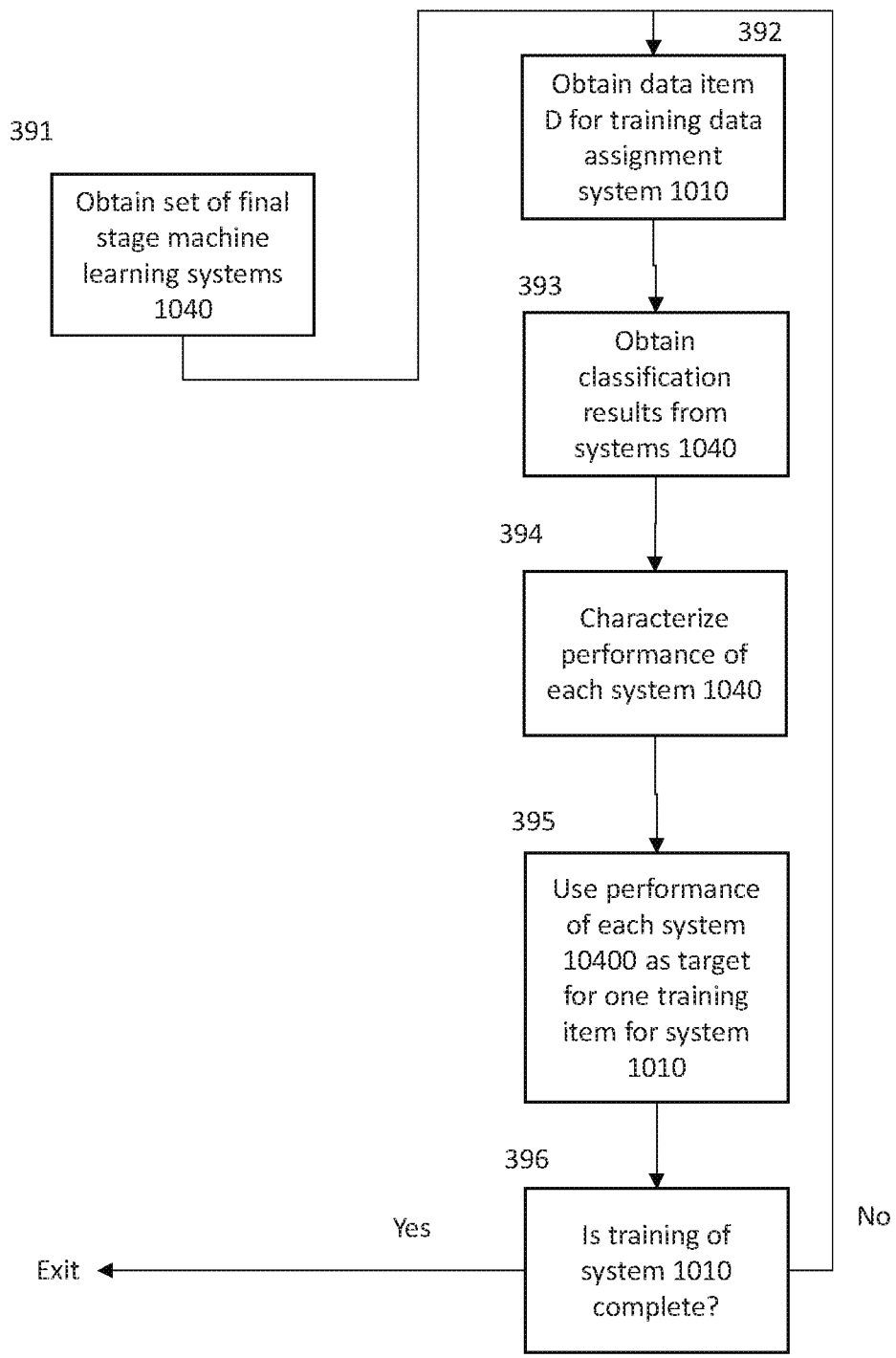
FIG. 3 a flow chart of a method of training first stage data assignment systems according to various embodiments of the present disclosure.

Data assignment system 101 is also a machine learning system. As an illustrative example (Example 1.a), assume there is already a set of machine learning systems 104, as indicated in block 301 of FIG. 3. FIG. 3 illustrates a preliminary training of data assignment system 101. In some embodiments, there will be later rounds of training first stage data assignment system 101 in a process that jointly trains first stage data assignment system 101 and final stage classifiers 104. In some embodiments, first stage data assignment system 101 is trained first and is used to create initial versions of final stage classifiers 104.

In this illustrative example, illustrated in FIG. 3, the task of data assignment system 101 is to assign each input data item D to $104_{best(D)}$, that is to the member of the set of machine learning systems 104 that is most likely to classify data item D correctly. Blocks 302 through 306 iteratively train first stage data assignment system 101 to optimize this objective. Block 302 obtains an item D of input training data. Block 303 classifies data item D with each of the final stage classifiers 104.

Block 304 characterizes the performance of each of the final stage classifiers. That is, it determines, for each final stage machine learning system 104x, whether the classification made by 104x is correct. In some embodiments, each final stage machine learning system 104x also returns a score for its selected category and the scores are calibrated such that it is valid to compare scores returned by different systems of the set of machine learning systems 104. For example, if each machine learning system may be a neural network and the output nodes may all have sigmoid activation function, or if the set output nodes are normalized by a softmax operation, then all the output nodes may have activations between zero and one, the output node with the highest activation is the selected category, and it is valid to compare these maximum activation values to find the neural network, among those that have the correct answer, the one that is most confident.

Block 305 uses the characterization done by block 304 to set a target yD for one item of supervised training of first stage data assignment system 101. For example, if comparative scores are available, block 305 may create a target vector for the output of first stage classifier 101 that has the value one for the output that corresponds to the final machine learning system 104 that has the highest score for the correct answer, and has the value zero everywhere else. As another example, block 305 may create a target vector that has the value one for every final stage machine learning system 104 that has the correct answer, and has the value zero everywhere else. This example method may be used even if comparative scores among the final stage machine learning systems 104 are not available, but it may also be used even if scores are available.

Figure 5:
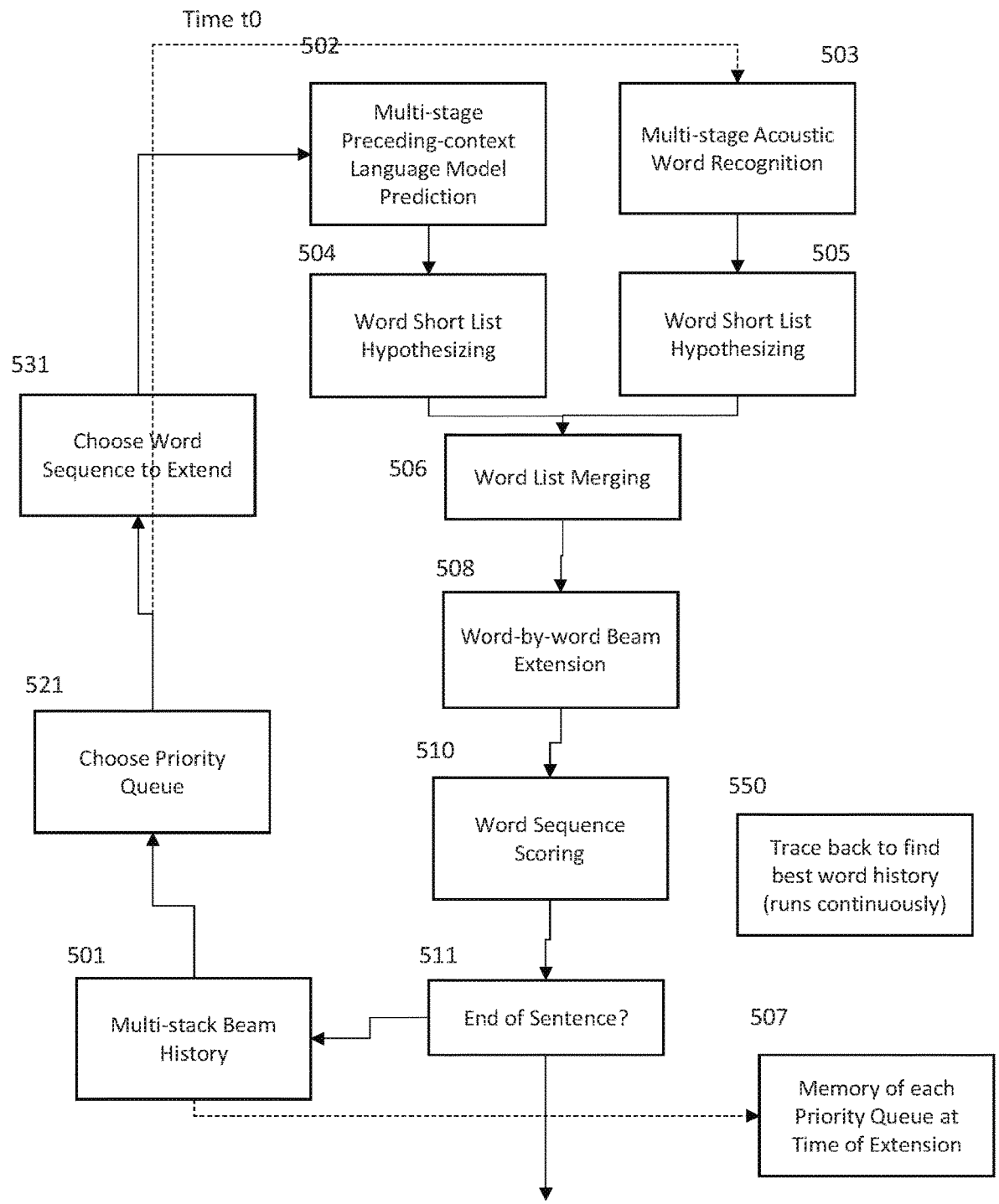
FIG. 5 is a block diagram of a speech-recognition multi-stage machine learning system according to various embodiments of the present disclosure.

Block 306 uses the output target computed in block 305 for one training example for supervised learning by first stage data assignment system 101. As an illustrative embodiment, system 101 could be a feed-forward deep neural network trained by stochastic gradient descent with customized hyperparameters controlled by learning coach 105, as shown in FIGS. 1, 2, and 5. For example, if first stage machine learning system 101 is a feed-forward artificial neural network being trained for this preliminary training by supervised learning with stochastic gradient descent computed by back propagation with network weights updated for each minibatch of training data, with sigmoid activation function $\sigma(x)=1/(1+\exp(-x))$ for hidden layer nodes, softmax for output nodes, using L2 regularization, Nestorov's momentum, and customized hyperparameters controlled by learning coach 105, then the data D and the target yD may be used as one training example (that is, for one example m in one minibatch) in the supervised learning algorithm represented by the following pseudo-code, wherein the minibatch size $M_{1,i,j}$, the learning rate $\eta_{1,i,j}$, the regularization parameter $\lambda_{1,i,j}$, and the momentum parameter $\mu_{1,i,j}$ are all customized hyperparameters controlled by the learning coach 105:

---

Initialize each weight;
Do until a stopping criterion is reached: {
  1. Input a set (minibatch) of training examples
  2. For each training example m, set $a_{0,i}(m)$ and perform the following steps:
    a. Feedforward (softmax output): For each $l = 1, 2, \ldots, L-1$ $$\text{compute } z_{l,j}(m) = \sum_{i=0}^{n_l} w_{l-1,i,j} a_{l-1,i}(m),$$

$$a_{l,j}(m) = \sigma(z_{l,j}(m)), \quad a_{L,k}(m) = e^{z_k}/\Sigma_j e^{z_j}$$

b. Output error gradient $\delta_{L,j}(m)$:
      $\delta_{L,j}(m) = -(y_j(m) - a_{L,j}(m))/n_L$
    a. Backpropagate error gradient: For each $l = L-1, L-2, \ldots, 2, 1$ compute $$\delta_{l-1,i}(m) = a_{l-1,i}(m)(1 - a_{l-1,i}(m))\sum_{j=1}^{n_l} w_{l-1,i,j}\delta_{l,j}(m)$$

3. Gradient descent: For each $l = L-1, L-2, \ldots, 2, 1$ update the weights $\tilde{v}_{l,i,j} = v_{l,i,j}$ $$v_{l,i,j} \leftarrow \mu_{l,i,jk} v_{l,i,j} - \eta_{l,i,j} \sum_{m=1}^{M} a_{l,i}(m)\delta_{l+1,j}(m)/M_{l,i,j}$$

$$w_{l,i,j} \leftarrow w_{l,i,j}\left(1 - \frac{\eta_{l,i,j}\lambda_{l,i,j}}{n}\right) - \mu_{l,i,j}\tilde{v}_{l,i,j} + (1 + \mu_{l,i,j})v_{l,i,j}$$

---

This pseudo-code may also be used for training a feed forward neural network for any other example in this disclosure. Additional learning enhancements that are well known to those skilled in the art, such as dropout and batch normalization, may optionally also be used. Additional learning optimizations controlled by learning coach 105 also may optionally be used. As may be seen from this pseudo-code, the first-stage data assignment system 101 may be trained using the target output values $y_j(m)$ set in block 304 for the input data item corresponding to example m in the current minibatch. The softmax objective function will make the training attempt to make the output of the neural network for system 101 output a value of one for the final stage machine learning system 104 that is most likely to correctly classify example m.

As mentioned, this round of training is only a preliminary training round for first stage data assignment system 101. Therefore, it may be done on a relatively small subset of the training data, which makes it more practical to perform the classification by every one of the final stage machine learning systems required in block 303.

There are other methods for obtaining or training a preliminary version of first stage data assignment system 101. For example (Example 1.b), the preliminary version of first stage data assignment system 101 could be trained to do the same classification task that is to be done by the total system represented by FIG. 1 or FIG. 2. In other words, in this image classification example, the first stage system 101 could do a preliminary classification of the images.

As one illustrative example of a system with this type (that is, Example 1.b) of first stage data assignment system 101, there could be one final stage machine learning system 104 for each category c, and the first stage data assignment system 101 could send each input data item D to the final stage machine learning system that corresponds to the category that the first stage data assignment system 101 chooses as the category for the data item D. In this example, each final stage machine learning system 104 would specialize in confirming or changing the category selected by the first stage data assignment system with a different final stage classifier specializing in each category. For example, if the possible image categories include "cat" and "dog," then there would be a final stage machine learning system specializing in confirming or reclassifying images that the first stage data assignment system classifies as "cat" and another one specializing in images that the first stage data assignment system classifies as "dog."

There are other illustrative examples for final stage machine learning systems 104 when the first stage data assignment system 101 classifies the images. For example, there could be a final stage machine learning system for every ordered pair of classification categories <c1, c2>, where c1 is the category with the best score and c2 is the category with the second-best score. This illustrative example (Example 1.c) could be used if it is desired to have more final stage machine learning systems 104 than the number of categories in the image classification task. Similarly, there could be a final stage machine learning system for every triple of categories <c1, c2, c3>, where c1, c2, and c3 are respectively the best, the second-best, and the third-best categories.

Another illustrative example begins with a preliminary first stage data assignment system 101 that is an ensemble of N machine learning systems. In this illustrative example (Example 1.d), the ensemble would rank the best categories c1, c2, c3, etc. by voting among the ensemble members, by averaging their scores, or by other means. It is also assumed that the ensemble members are distinct and are numbered from 1 to N. In this illustrative example, let <n1, n2> be the ordered pair where n1 is the number of the ensemble member giving the best score to c1 and n2 is the number of the ensemble member giving the best score to c2. Let there be a final stage machine learning system 104 for each ordered pair <n1, n2>. Then each final stage machine learning system 104 would specialize in resolving disagreements between a particular pair of first stage data assignment systems 101. This disagreement resolution might be particularly insightful if the two ensemble members n1 and n2 are different forms of machine learning system. For example, one could be a support vector machine and one could be a deep neural network.

Another special case occurs when each stage of data assignment system 101 (and additional stages 102 in FIG. 1), and the final stage machine learning systems are different types of machine learning systems with different design characteristics, different computational requirements, and different performance as a function of the amount of training data, with the order of the stages design to optimize the characteristics of the overall system. As an illustrative example (Example 1.e), the first stage data assignment system could be a decision tree or some other machine learning system type designed to do a classification, with a large number of categories, but with a small amount of computation. The next stage data assignment systems 102 could be support vector machines or some other machine learning system designed to give robust performance with a limited amount of data. The next stage could be deep neural networks designed for high performance and flexibility to adapt to the various specialized tasks created by the earlier stages of data selection. This stage could be the final stage machine learning systems 104, or just another stage of data assignment systems 102. Optionally, there could be even more stages of data assignments systems with the type of machine learn system continuing to alternate from one stage to the next. If a stage of data assignment systems 102 only has one output destination per category, as in Example 1.b, then the number of destinations does not grow from one stage to the next. With output destinations as in Examples 1.c, 1.d, or 1.e, the number of destination systems could grow substantially from one stage to the next. In a multi-stage design, this expansion in the number of destinations could come at an early stage or at a later stage.

As another example of designed disagreement, the ensemble members could be deliberately trained to have different strengths and weakness. As an illustrative example of how to train an ensemble to have different strengths and weakness, the ensemble members could be final stage machine learning systems in a previously trained multi-stage machine learning system.

There are many more ways that a set of final stage machine learning systems 104 can be defined and trained from a preliminary first stage data assignment system 101. For example, in addition to the classification done by the preliminary first stage data assignment system 101, metadata could be used in defining and selecting the final stage machine learning systems. For example, if the images are downloaded from the web, words in the caption or other text on the web page could be used as metadata for an image.

All the illustrative examples described above are designed for the case in which the preliminary data assignment system 101 classifies the same categories as the full multi-stage system. Example 1.b creates and trains as many final stage machine learning systems 104 as there are classification categories. Examples 1.c, 1.d, and 1.e all create even more final stage machine learning systems. In any of these cases, the number of final stage machine learning systems 104 can be reduced by merging some of the final stage machine learning systems. If they have the same architecture, two machine learning systems can be merged by training a single network with that architecture from scratch with the union of all the training data assigned to two machine learning systems being merged. The data assignment to the reduced set of final machine learning systems can be easily found by a table look-up with one entry for each final machine learning system in the unmerged set. The merger of final stage machine learning systems 104 can be managed by the learning coach 105 to optimize a specified combination of cost and performance.

Similar techniques can also be used when the preliminary classification system 101 uses a different set of categories. For example, the preliminary first stage data assignment system 101 could be trained from an existing set of final stage machine learning systems 104, as in illustrative example 1.a.

Illustrative Example: Iterative Mutual Training. Consider what happens when Example 1.a is followed by Example 1.b. Let S1 be the set of final stage machine learning systems that are the basis for example 1.a. Example 1.a creates a preliminary first stage data assignment system 101 P1 that attempts to predict which member of S1 is most likely classify each item of data correctly. Then, a new set of final stage machine learning systems S2 can be created in which each system is trained on data as selected by preliminary first stage data assignment system P1, as in example 1.b. Because each member in S2 has been trained to specialize on data on which its performance has been observed to be better than the other members of the set S1, the average performance of the members of S2 would be expected to be better than the average performance of S1. Since P1 controlled the data selection for training the members of S2, then even without retraining P1 should do well on the task of predicting which of the members of S2 are mostly likely to classify each data item correctly. Obtain P2 by retraining the first stage data assignment system 101 to produce P2, which predicts which member of S2 is most likely to classify each data item. Then P2 should do even better than P1. In other words, P1 is trained according to example 1.a; S2 is a set of final stage machine learning systems trained according to example 1.b; and P2 is a preliminary data selection system that has been re-trained according to example 1.a applied to S2. The total process described in this example is an application of example 1.a followed by an application of example 1.b and then followed by another application of example 1.a. The process can be continued as an iterative procedure alternating between example 1.a and example 1.b.

Another illustrative embodiment starts with example 1.b followed by 1.a, which leads to essentially the same iterative mutual training. Note that any pattern classification system can be turned into a first stage data assignment system 101 by this method. This means that any pattern classification task that can be done with a conventional single-stage machine learning system has multi-stage embodiments.

These steps are not mathematically guaranteed to improve the performance with each round. However, the performance can be monitored by learning coach 105 and the performance can be checked on data that has been set aside. If the performance declines, learning coach 105 can stop the process or can experiment with structural changes to either data assignment system 101 or one or more of the final stage machine learning systems 104 to look for a change that improves performance or that improves cost-performance.

At any point in the mutual training process, example 1.c, 1.d, or 1.e can be used in place of example 1.b. This will increase the number of final stage machine learning systems. With further training, and an adequate amount of training data, additional final stage machine learning systems will generally improve overall performance, especially with learning coach 105 checking the performance on separate data and controlling the amount of regularization through control of the hyperparameters.

Note that, unlike conventional ensembles, the amount of computation does not grow proportional to the number of final stage machine learning systems. In fact, the amount of computation is nearly constant, growing only slowly with any increase in the number of final stage machine learning systems.

If, however, it is desired to reduce the number of final stage machine learning systems, the learning coach 105 can experimentally merge two or more of the final stage systems and test the cost-performance of the smaller system. As an illustrative example, learning coach 105 could do this experimental merging process starting with pairs of final stage machine learning systems whose output activations are most highly correlated.

Illustrative Example: Distributed Data Sources and Destinations. FIG. 4 shows an illustrative embodiment in which the data is collected at many, geographically distributed sites 112. Examples of such distributed data collection include speech recognition with many end-user systems controlled locally but with processing done in the cloud, machine learning aids for medical diagnose with centralized machine learning from data collected at each hospital or clinic, machine learning to control self-driving cars, machine translation between mobile phones, and others.

In this illustrative embodiment, there is a first stage classifier locally at each data source. The final stage classifiers 104 may also be at many geographically distributed sites. An aspect of this invention is that the amount of data communication among the many first stage classifiers 101 and among the many final stage classifiers 104 is quite moderate and is within the capacity of wide-spread data communication networks, such as the internet and mobile phone cellular data networks. In addition to the final stage classifiers 104, at each distributed site there may be a number of inactive final stage machine learning systems 111. These inactive final stage machine learning systems 111 may be represented in a form designed to minimize cost. For example, they may be stored on inexpensive, secondary computer memory, such as hard drives. This is in contrast to the active final stage classifiers 104, which may be stored in a form that allows for ready access, such as primary computer memory, such as RAM.

Block 110 is a data switching network. It is capable of simultaneously sending data from $N_d$ first stage data assignment systems to $N_m$ final stage machine learning systems. Preferably it is a packet-switched network or other form of data switching network whose cost grows only proportional to first order in $N_d$ and $N_m$, rather than proportional to $N_d*N_m$.

The learning coach 105 can control the flow of training data to a number of final stage machine learning systems 104 or 111 such that there is a high degree of redundancy. For example, learning coach 105 may have each training item sent to multiple final stage machine learning systems so that for each machine learning system 104 or 111 there is other machine learning systems 104 or 111 that have been trained on substantially the same data. Learning coach 105 can keep track of the sets of final stage machine learning systems 104 or 111 that have had substantially the same training. When a first stage classifier 101 assigns a data item to be recognized to an inactive final stage machine learning system 111 or a final stage learning machine system that is otherwise not currently available on the data communication network, the learning coach 105 substitutes another final stage machine learning system 104 that has had similar training as the originally chosen destination system.

If the total amount of training data is small enough such that, once distributed, the data sent to each final machine learning stage can be stored locally, then the data switch 110 only needs to be active while the first stage data assignment systems 101 are still being trained and during operation. That is, iterative training of the final machine learning systems 104 can proceed for multiple iterations through the training data stored locally at each final machine learning system 104. If the data is so large that it cannot all be stored locally with the final stage machine learning systems 104; if the first stage data assignment systems 101 are still being trained; or if new data is continuing to arrive, as during operation, then data switch 110 remains active.

In one illustrative embodiment, there is a data buffer at the output of each first stage data assignment system 101 and/or at the input of each final stage machine learning system 104. In such embodiments, the data can be buffered such that most of the final stage machine learning systems 104 can be kept busy during training. If there are a large number of active sources during operation, and the application is such that classification requests can be arranged in batches for later execution, then again most of the final stage machine learning systems 104 can be kept busy.

In another illustrative embodiment, the redundancy described above can be further extended, with a large number of redundant systems, with a large fraction of them designated inactive under control of learning coach 105. The final stage machine learning systems that are designated inactive may be stored on less expensive secondary computer memory, such a hard drive and be loaded into central processing unit (CPU) RAM, graphics processing unit (GPU) RAM or AI accelerator RAM only as needed, under the control of the learning coach 105.

Multiple Illustrative Examples: Speech Recognition. Speech recognition involves two distinct sources of information about each word: (1) the acoustic evidence from the spoken sounds, and (2) the context information available from recognizing the surrounding words, also called a "language model." During operation, the two sources of information perform separate analyses, then communicate with each other to combine their information and make a choice for each word to be recognized. In one illustrative embodiment, each of these two sources of information is modeled and trained separately.

Speech recognition is a rich source of example embodiments of multi-stage machine learning systems. A multi-stage machine learning system may be used for each of these knowledge sources. In some embodiments, there is also a backwards language model for the word sequence going backwards from the end of each sentence. In addition to both a forward and backward language model, there are multiple levels of acoustic classification, such as phonemes, syllables, words and others, each of which may be embodied as a multi-stage machine learning system. Finally, there may be a further multi-stage machine learning system refining the recognition process at the sentence level, or at higher levels.

The following examples illustrate multiple ways that the acoustic analysis in speech recognition may be done as a multi-stage machine learning system, such as illustrated in FIG. 1 or FIG. 2, or as a distributed system as illustrated in FIG. 4.

Illustrative Example: Spectrogram Recognition. A spectrogram is a two-dimensional plot of an audio signal, with time along the horizontal axis, frequency along the vertical axis, and the gray scale at a particular point on the plot representing the amount of energy at the corresponding frequency at the particular time. Spectrograms have long been used as a tool for human experts studying speech signals. They provide a visual representation of most of the characteristics of each speech sound. Human experts can recognize the words that have been spoken just by looking at a spectrogram. Many speech recognition systems use the data in a speech spectrogram, or transforms of that data, as the input to the speech recognition process. This illustrative example uses the spectrogram image itself. It takes as training data spectrograms that have been aligned to a script using forced alignment, a process well known to those skilled in the art of speech recognition. Using the alignment, the spectrograms are separated into sections, with a section of spectrogram for each word in the script. These images are then used to train a system to recognize spectrograms of words using the technique described above for massive distributed image classification. Note that spectrogram recognition is only one illustrative example. Spoken language has a rich structure that has been studied for many centuries. There are many other choices of ways to perform speech recognition as a multi-stage process.

Illustrative Example: Phoneme Recognition. Another illustrative example breaks speech down into units shorter than a word, namely phonemes. A phoneme is the fundamental unit of sound in a spoken language, roughly corresponding to a single letter in a written language that uses an alphabetic script. However, the concept of "phoneme" is actually a higher-level linguistic abstraction that has a complex relationship to the collection of sounds that represent a phoneme. There may be many different sounds that all represent the same phoneme in a particular language. Usually native speakers of that language will ignore those differences, and often not even be aware of them. However, two sounds that are both instance of a single phoneme in one language may represent two distinct phonemes in a second language. Speakers of the second language can easily hear the difference between the two sounds. As one way to represent this complexity, acoustic phoneticians use even more detailed, lower-level representations of sounds, allophones and phonetic features. The different sounds that make up a phoneme in a given language are called allophones. The phonetic features are particular attributes that distinguish one speech sound from another, such as the position of the tongue, the degree of openness of the lips, and others.

In this illustrative embodiment, first stage data assignment system 101 in FIG. 2 is based on classification of multiple phonetic features. Many phonetic features are binary. That is, the feature is either present of absent. Examples include voicing, nasality, and lip rounding. Others, such as tongue position, may represent an articulator, the tongue in this case, that moves through a continuum of positions. However, linguists generally classify the possible values for such a feature with a finite set of categories, such as, say, ten distinct positions for the tongue.

Figure 7:
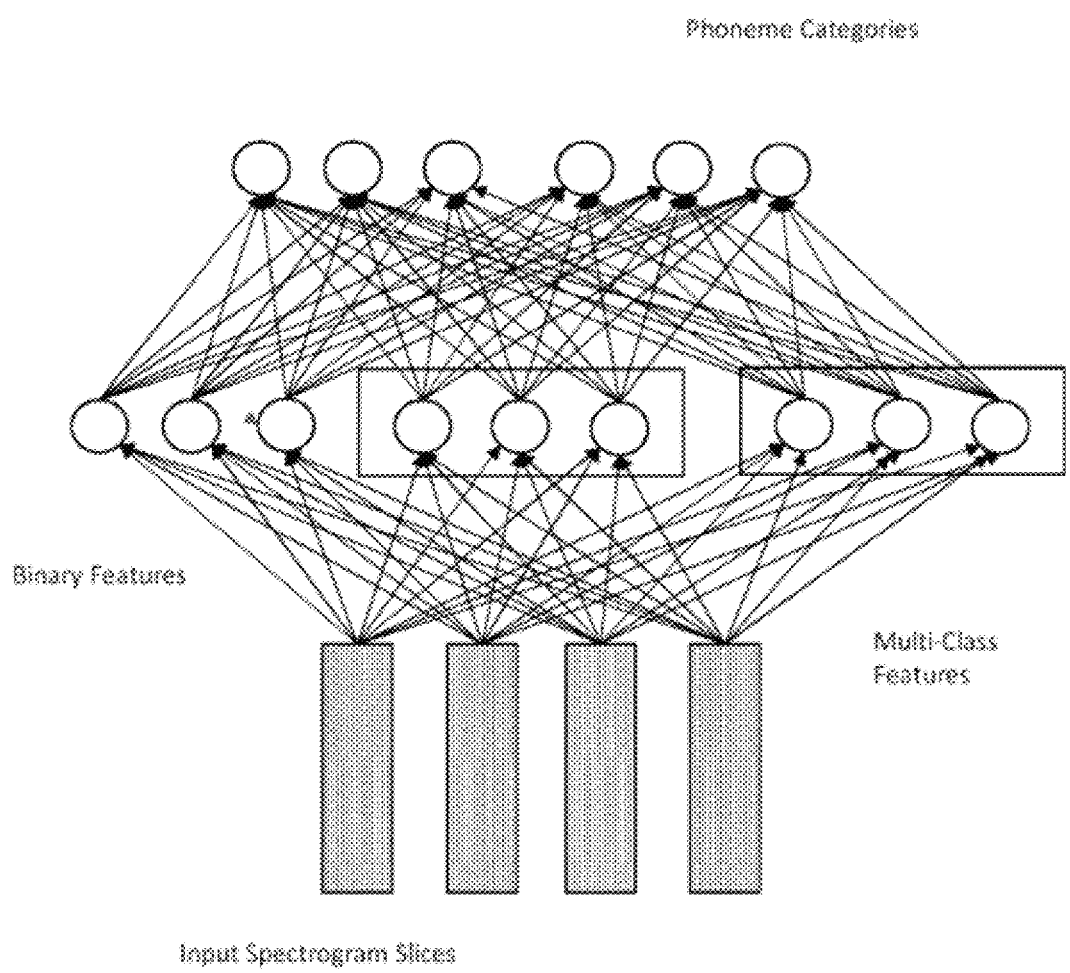
FIG. 7 is a sketch of a neural network designed for phoneme recognition.

One illustrative embodiment of a multi-stage phoneme recognition begins with the non-multi-stage neural network shown in FIG. 7. The two-layer neural network shown in FIG. 7 is a phonetic-feature-based phoneme recognizer that is trained, for example, using stochastic gradient descent computed through backpropagation, such as indicated in the pseudo-code above. Although it is a two-layer network, it does not have a data assignment system 101, and by itself is not a multi-stage machine learning system in the sense of this invention. It will be used in two different ways as a component in illustrative embodiments of multi-stage phoneme recognition systems.

The architecture shown in FIG. 7 is designed to represent the phonetic features that were mentioned above and their relationship to phonemes. The middle, hidden layer in FIG. 7 represents the features. The individual nodes to the left in the middle layer represent binary features, such as presence or absence of voicing. The activation function for each binary feature node is the sigmoid function $\sigma(x)=1/(1+\exp(-x))$. Whether the feature is present of absent would be represented by whether the sigmoid activation function is close 1 or close to 0. The nodes grouped in boxes represent multi-valued features. The nodes in each box have a softmax activation with respect to the nodes together in the box. That is, if $x_j$ is the input to node number j of the nodes in a box, then the activation function for node j is $$a_j = \frac{\exp(x_j)}{\sum_k \exp(x_k)},$$

where the sum is over all nodes k in the same box. An activation close to one represents the feature having the categorical value represented by the node. As the network shown in FIG. 7 learns to recognize the phonemes, the hidden layer will learn to recognize the features, without direct supervised training. In some embodiments, the middle layer could receive some supervised training, as well as training as part of the phoneme recognition network shown in FIG. 7.

Although the number of phoneme categories is relatively small compared to the number of words in a language, typically 50 or so compared to 100,000 or more words, phoneme recognition is surprisingly difficult. That is, the percentage error rate is relatively high because the acoustic features for a phoneme are highly variable with context, and there is less redundancy in phoneme recognition than in the recognition of words. Thus, there is a need for improved phoneme recognition, such as might be achieved by a multi-stage system.

The following illustrative embodiments show two ways that the network shown in FIG. 7 may be used to make a component in a multi-stage phoneme recognition system. First the entire system shown in FIG. 7 can be used as a first stage data assignment system, as discussed for example 1.b in the illustrative example of mutual iterative training. In addition, other illustrative examples from the mutual iterative training, such as example 1.c, can be used to increase the number of final machine learning systems 104, as described in the discussion of the examples of mutual iterative training. This embodiment produces an embodiment of a multi-stage system with many more trainable parameters than original system shown in FIG. 7.

As another illustrative embodiment, rather than use the network in FIG. 7 as a whole, a data assignment system 101 can be built as a decision tree based on the features in the feature-vector layer of FIG. 7. Each single node in the middle layer of FIG. 7 is equivalent to a logistic regression, discriminating whether the feature is present based on a weighted linear sum of input values. As such, it can be used as a branch node in a decision tree. Similarly, any boxed set of nodes in that layer can be used as an n-way branch point in a decision tree. The decision tree can be used as a first stage data assignment system 101. The weights copied from the network trained in FIG. 7, however, are only the initial weights for the decision tree in the multi-stage system. Because the branch points in the decision tree are determined by sigmoid or softmax neurons, their weights can be trained by backpropagation. This backpropagation can be used in mutual iterative training, as described above.

Illustrative Example: Recognition of Higher Level Acoustic Units. In speech recognition, there are recognizable units at multiple levels. In particular, both syllables and words can be represented as sequences of phonemes. As an intermediate level, a syllable can be broken into an onset, a nucleus, and a coda. Words can be assembled into phrases and sentences, with recognizable acoustic correlates to the phrase of sentence structure. Multi-stage machine learning systems can be used at any of these levels. By way of illustration, a decision tree could be build based on questions about the identity of recognized phonemes. A simple illustrative example is to use the phoneme sequence directly as a first stage data assignment system 101, although this is only practical for relatively short sequences. For a language with P phonemes, the number of distinct phoneme sequences of length L is PL, which may be within the range desired for the number of final stage machine learning systems for syllables or short words.

However, another illustrative embodiment is more efficient and extends easily to long words. This illustrative embodiment builds a decision tree based on asking questions about the identities of the phonemes in the sequence. The questions do not need to ask about the phonemes in order. For example, the first question could be "Is there a vowel?." The next question could ask "What is the identity of the first vowel?" The decision tree could be built using techniques well known to those skilled in the art, such as CART, ID3, or C4.5. The decision tree can then be used as a first stage data assignment system 101 for recognition of syllables or words.

Illustrative Example. Combining Acoustic and Language Knowledge in Non-Final Stages. Another illustrative embodiment for word recognition uses preliminary acoustic recognition, such as phoneme recognition in combination with information from the language model. In a real-time system, when a word is being recognized, the previous words will already have been recognized, although possibly with errors. However, even imperfect information, when added to the acoustic recognition, will improve performance. In particular, it is not essential for the previous words to be recognized correctly for use in non-final stages of a multi-stage machine learning system as described herein. The non-final stages only determine the distribution of the data, not the final classification. In fact, in some embodiments, the learning coach 105 simulates errors in addition to distributing data to multiple destinations as a means of making the training more robust. An illustrative embodiment of a non-final stage data assignment system 101 that uses both acoustic knowledge and language knowledge is a decision tree that has some nodes that ask questions about the acoustics and some nodes that ask questions about the identities or latent features of preceding words. This illustrative embodiment uses information gain as the criterion for selecting each question, including deciding whether to ask an acoustic question of a language question. The use of information gain for selected nodes in a decision tree is well known to those skilled in the art. Thus, at each node, this embodiment automatically chooses to use a language question when that most reduces uncertainty about the current word, but instead chooses an acoustic question when that most reduces the uncertainty. Therefore, the final stage machine learning system(s) 104 that receive the data will be specialists in distinguishing the hard cases, those in which the words being compared all match the current acoustic reasonably well and also are plausible given the preceding words. This property means that the final stage machine learning systems 104 concentrate on the cases that cause the most errors rather than in building general purpose models.

Illustrative Example: Sentence Level Recognition. Combining the word-level acoustic knowledge and both the forward and backward language knowledge from a full-sentence context is a complex operation. The following description of an illustrative embodiment discusses many details that are specific to the process of modeling and combining these sources of knowledge. Once the word-level acoustic and language model analysis has been done, say by systems discussed above and illustrated by FIG. 2 and FIG. 4, the sentence-level combination of the knowledge, while complex, requires a relatively small amount of computation. In an illustrative embodiment, this computation can be done by a single system. For example, it can be done by any of the systems attached to the data switch 110, shown in FIG. 4. The data to be combined can be spread among all the final stage machine learning systems 104 in FIG. 4, but, as will be seen in the following discussion, the amount data that needs to be communicated per unit time is relatively small.

The illustrative embodiment of sentence-level recognition can use any of the multi-stage acoustic recognition systems and any of the multi-stage language modeling systems. However, to make this illustrative example concrete, a simple specific example of each will be described. In this illustrative embodiment, the acoustic analysis uses techniques similar to those used in the illustrative embodiments of image classification illustrated in FIGS. 1, 2 and 4, with a few modifications and additions. In an illustrative embodiment, the final machine learning systems 104 classify word-length portions of the acoustic signal with a category for each word in the vocabulary. A large vocabulary, continuous speech recognizer may have a vocabulary of 100,000 to 500,000 words. This acoustic component is, by itself, a multi-stage machine learning system.

One illustrative embodiment of language model context information is a neural network encoding each context word as a vector of latent features, with each such vector of latent features separately attempting to predict the next word from the preceding context, or the preceding word from the following context. An additional network layer combines the predictions of latent feature vectors into a prediction of the top K word choices, where K is a hyperparameter controlled by the learning coach 105. This combination is done separately for the preceding context and the following context. Both the preceding context language model and the following context language model is, by itself, a multi-stage machine learning system.

In continuous speech, usually there is no pause or other acoustic evidence of the time when one word ends and the next begins. Usually there is an easily detectable pause at the end of each sentence. Furthermore, the language model needs context of at least several words. Therefore, an illustrative embodiment of the multi-stage machine learning system processes speech in units approximating sentences or the acoustic intervals in conversational speech that approximate sentences, whether or not they are grammatical sentences. There are three illustrative embodiments that vary with respect to the time at which they finish the recognition process for a word and provide feedback to the user: (1) a real-time interactive embodiment, (2) a sentence-at-a-time embodiment, and (3) a batch processing embodiment.

The illustrative embodiment of a real-time, interactive system does not wait until the end of the sentence. It tries to provide the user feedback on each word, say by displaying the word on a screen. This embodiment organizes the speech recognition as a directional beam search proceeding forward in time, as illustrated in FIG. 5. In the illustrative embodiment, the processing precedes word-by-word from the beginning of each sentence to the end. The search for the best matching word sequence for the sentence is organized as a multi-stack beam search. The best scoring word sequences up to a given point in the sentence are stored in the multi-stack beam history 501. The multi-stack decoder is known to those skilled in the art of speech recognition. In this embodiment, it is combined with a multi-stage machine learning system for the language model 502 and a multi-stage machine learning system for the acoustic modeling and classification 503, rather than with hidden Markov process models.

The use of the word "stack" in the multi-stack decoder comes from the terminology used in information theory, referring to the "stack decoder" algorithm for decoding convolutional codes. In general computer science, the word "stack" has a different meaning. In general computer science, each "stack" in the "multi-stack" decoder would be called a "priority queue." Each beam history in the multi-stack beam history 501 is associated with a word sequence from the beginning of the sentence up the current point in the sentence. Each word sequence is also associated with the acoustic signal up to the point in time that is the estimated ending time of the last word in the sequence. However, different word sequences will have different estimated ending times, so there is a separate priority queue for each ending time. The scores for hypothesized word sequences that end at different times are not directly comparable, so for setting priority or for making decisions to prune the beam, word sequences are only compared if they end at the same time and are in the same priority queue.

Among the priority queues, priority is given to the priority queue that ends at the earliest time, so any priority queue whose word sequences end at an early time are processed and extended prior to any priority queue associated with a later time. As a consequence, viewed the other way around, when a given priority queue is being extended, all other active priority queues will have final words that start earlier than the time associated with the priority queue currently being extended and word ending times later than that time. In other words, all the word sequences in all the active priority queues will have word sequences whose last words are associated with time intervals that overlap with each other. Therefore, the multi-stack beam search proceeds forward in time, word-by-word, from the beginning of the sentence to the end, even though the word ending times are not synchronized.

Figure 6:
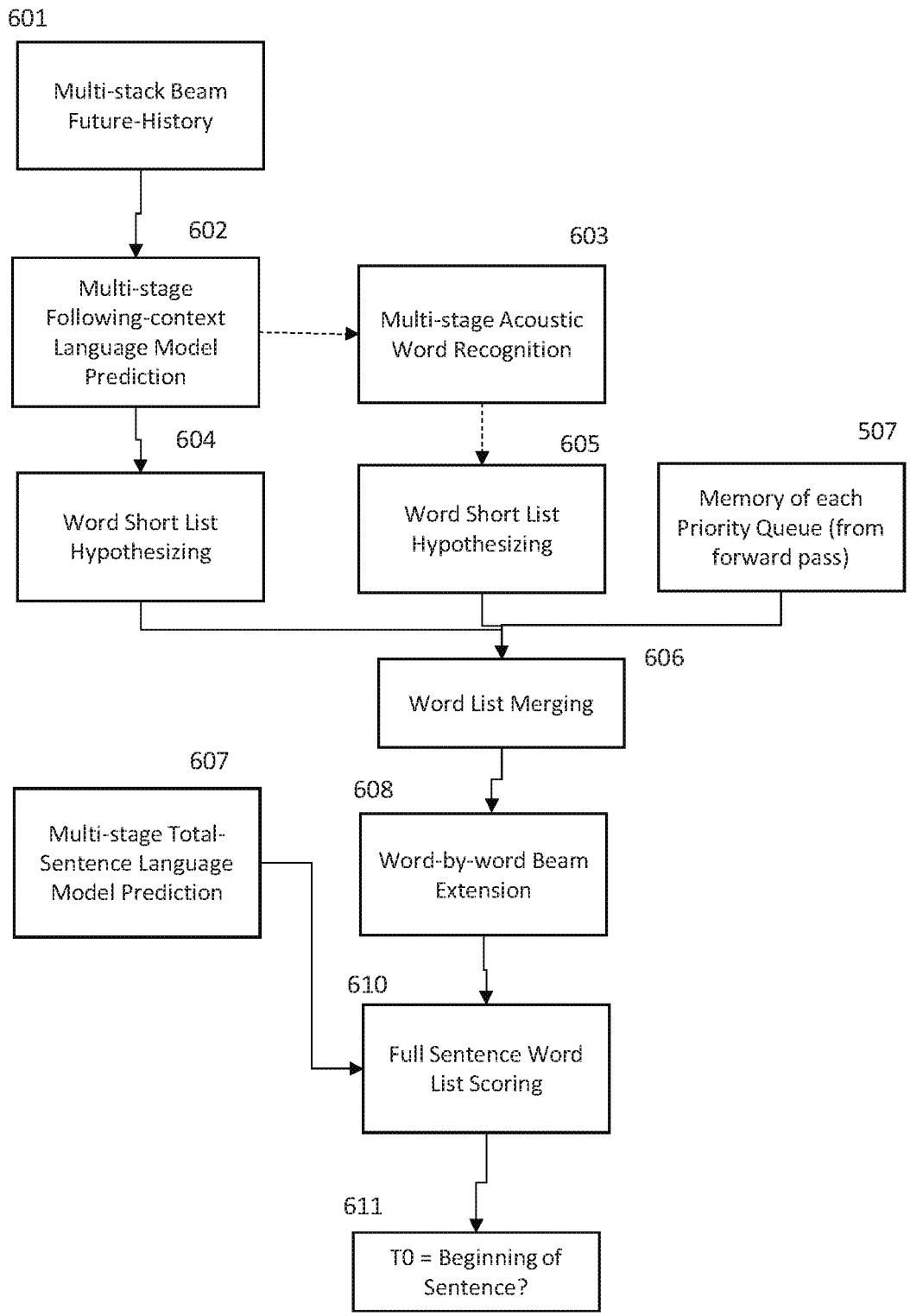
FIG. 6 is a block diagram of a speech-recognition multi-stage machine learning system according to various embodiments of the present disclosure.

An illustrative embodiment of the system utilizes a beam search, meaning that the entries in each priority queue are pruned by one or more mechanisms. For example, the total number of word sequences in each priority queue may be limited. Instead, or in addition, all entries whose scores are worse than the best score in the queue by some specified amount may be pruned and dropped from the queue. Each entry in each priority queue represents a word sequence from the beginning of the sentence to the current point (or backwards from the end of the sentence in the case of backward priority queues to be discussed later). The score of each entry is a combination of the score of the sequence of words from the preceding-context language model 502 and the acoustic word recognition 503. In this illustrative embodiment, both the preceding context language model 502 and the acoustic word recognition system 503 are multi-stage machine learning systems, as described above. These multi-stage machine learning systems may be large, distributed systems, as illustrated in FIG. 4. As will be seen, because the final stage machine learning systems 104 are very specialized, only a small number of them are active in the analysis of any one sentence, and the amount of data communication required to support the computation illustrated by FIGS. 5 and 6 is moderate. The score for each sequence is the sum of the scores for the words in the sequence, in the order in which they occur and matched to the acoustics for the time interval to which the word is associated.

The process proceeds by choosing word sequences from the highest priority queue (that is, the earliest queue). As the first step, or whenever the priority queue currently being processed is finished, a new priority queue is chosen by block 521, the priority being the queue with the earliest associated ending time. A copy of this priority queue is remembered by block 507 for later use in some embodiments. Word sequences are chosen from the current priority queue in priority order by block 531. The priority of the word sequences within the same queue is determined by their scores, best score first. WS1, the best scoring word sequence in the current priority queue Q1 is used to create one or more new word sequences 510, each such new word sequence adds a single word to the end of WS1. The words to be used to make extensions of WS1 are selected by blocks 502, 503, 504, 505, 506, and 508.

The word sequence associated with WS1 is sent to preceding-context language model 502. Using that word sequence as context, preceding context language model 502 supplies a list of the most likely words to be the next word following the given word sequence to block 504.

The estimated ending time t0 associated with Q1 is sent to word acoustic recognition block 503, which produces a short list of the words best matching the acoustic interval beginning near the end time associated with the priority queue Q1, with variable ending time depending on the word being matched.

For each word that appears in only one short list, either 504 or 505, the score for that word is requested from the opposite module 503 or 502. The union 506 of the word lists is formed and the combined score is computed for each word in the merged word list 506. List 506 may be pruned based on the combined scores.

Block 508 creates new word sequences with combined scores by selecting a word W in list 506 and adding it at the end of WS1. Each such new word sequence is added to the priority queue corresponding to the estimated ending time of the new word that has been added to the end, if the combined score of the new word sequenced WS1+W is good enough relative to the current scores in that priority queue.

After each word sequence WS1 has been extended, a new word sequence is selected from Q1. When all the word sequences in a priority queue have been extended, processing continues with a new priority queue, with a later ending time. This processing continues with later ending times until the end of the sentence is reached and all priority queues with earlier ending times have been extend to the end of the sentence.

In the illustrative real-time processing embodiment, another process 550 can run in parallel. Process 550 continually traces back through the word histories to count the number of entries in active queues that are descendants of each of the word sequence entries at each earlier time. Once an entry at an earlier time has no active descendants, it will never have any active descendants and can be discarded. Once there is only one word sequence entry with descendants among all the priority queues for a long enough time interval, that entry will always be the only word sequence in that time interval that has descendants and can be displayed to an interactive user as a final answer. The condition for the time interval is that it be long enough so that no word spans from a time earlier than the beginning of the time interval to a time later than the end of the time interval. Optionally, words can be displayed to the user as temporary "best answer so far" before they satisfy the "only one with descendants" condition. The traceback process 550 can always chose a best final answer for the whole sentence as soon as the sentence is finished, except for the processing delay.

The illustrative embodiment of the two knowledge sources, the acoustic knowledge source and the language model knowledge source are each a multi-stage machine learning system with word-size units, for which the final stage machine learning systems 104 may be distributed among multiple physical locations. In an illustrative embodiment, the multi-stack beam search and priority queue management for any one sentence is done on a single physical system. The priority queue beam search and word-by-word extension of the word sequences gather and combine information about multiple words. This information is sent to the system managing the priority queues using data switch 110 in FIG. 4. The quantity of information exchanged between the acoustic knowledge source, the language knowledge sources, and the priority queue management system for a given sentence is only hundreds of bytes per second, which can be easily managed by a packet-switching or other wide area network.

The sentence-at-a-time and the batch processing embodiments both process backwards from the end of the sentence, as well as forwards in time from the beginning of the sentence. The illustrative embodiment first does a forward pass, like the real-time embodiment illustrated in FIG. 5. The backwards processing from the end of the sentence is also a multi-stack beam search similar to the one illustrated in FIG. 5, but running backwards in time. It extends the word sequences from the backwards multi-stack with a process similar to the one illustrated by blocks 502, 503, 504, 505, 506, 508, and 510, but with a few differences. Blocks 601, 602, 603, 604, 605, and 606 in FIG. 6 are like the corresponding blocks 50x in FIG. 5. In this illustrative embodiment, blocks 602 and 603 are multi-stage machine learning systems respectively for language modeling and acoustic word recognition, as described previously, expect that block 602 uses the following words as context and proceeds backwards through the sentence. Block 603 computes an acoustic word match similar to the one computed by block 502, except it uses as additional information the estimated starting time for the following word as well as the estimated ending time for the preceding word. Block 507 is the memory block 507 in FIG. 5. At the time that the backward computation is being done, block 507 remembers the priority queues and scores of the computation from the forward pass and, on demand, can retrieve scoring information needed by blocks 606 and 610. This scoring information includes the language model score for each word sequence in the queue and the acoustic score up to the estimated ending time of the last word in that word sequence. Note that the history from block 507 has the scores for all words up to, but not including the current word, block 603 computes the acoustic score for the current word, and block 602 computes the scores for all the words after the current word, up to the end of the sentence.

Let t2 be the time of the estimated beginning time for the priority queue currently being processed in the backwards pass. Block 606 does a three-way merge of word lists. One word list 605 is from the acoustic analysis of time intervals proceeding backwards from time t2 to earlier times. One word list 602 is predicted from the context of following words in the word sequence currently being extended backwards from time t2. The third word list is the list of final words in the word sequences in the priority queue from the forward pass with preceding context word sequences ending at time t2.

As with block 508, block 608 evaluates the score of one sequence, based on the word selected from the merged word list 606 to be the word to extend backwards the word sequence chosen from the priority queue in block 601. Each one-word extension W of the word sequence WS0 taken from the backward-going priority queue selected from block 601 is matched against the acoustics by 603, giving an estimated beginning time, which will be called t1, and an acoustic score A(W, t1, t2) for the interval [t1, t2]. Let WS1 represent the word sequence WS1=W+WS0.

Block 610, however, does a whole-sentence scoring procedure rather than the one-sided scoring procedure of block 510. It combines three acoustic scores and computes a language model score for the concatenated word sequence representing the whole sentence. For purpose of discussion, assume that the numerical signs of the scores are such that maximum scores are best. For each word sequence WS2 in the forward priority queue for time t1, block 610 computes the total sentence language model score LS(W3) for the word sequence W3=WS2+W+WS0. Let A(WS2, 0, t1) be the acoustic score for the word sequence WS2 for the interval [0, t1], and let A(WS0, t2, T) be the acoustic for the word sequence WS0 for the interval [t2,T], where T is the time of the end of the sentence. Then the total sentence score for WS1 is TS(WS1,t1)=max$_{WS2}$(LS(W3)+A(WS2, 0, t1)+A(W, t1, t3)+A(WS2, t3, T)). TS(WS1,t1) is put into the backwards priority queue for time t1.

Because the backward pass computes a complete sentence score for each word sequence being evaluated, there is no need for a large beam. Only a relatively small number of word sequences need to be kept active for each point in time.

Once the backward pass has been completed, for either the sentence-at-a-time or the batch embodiment, the best scoring sentence can be selected. Alternately, some of the top sentences may be selected for further comparison.

Illustrative Example: Adding Additional Stages as a Final Stage Machine Learning System. If several candidate sentence-length word sequences are selected in the illustrative example of speech recognition, the entire speech recognition system, as described above and depicted in FIG. 5 or 6, may be treated as a non-final stage 101 in FIG. 2. That is, it can be used as a data assignment system, selecting which of many final stage machine learning systems 104 receives a copy of each item of training or operational data. For example, the data assignment system 101 could select a final stage machine learning system 104 based on the pair of words <W1, W2>, where W1 and W2 are words from corresponding positions in two of the top scoring sentences at the end of the backward pass for either the sentence-at-a-time or batch processing embodiment. Such an additional final stage could be added to any machine learning system. It will be particularly effective in any case in which there are multiple sources of complementary information, such as the acoustics and forwards and backwards language models in speech recognition.

In an illustrative embodiment, the final stage machine learning system is selected based on a pair of word identities <W1, W2>. The number of final stage machine learning systems may be as large as, e.g., the square of the vocabulary size, or any smaller number created by merging multiple final stage machine learning systems together, controlled by learning coach 105. For each difference in some word position between two of the top scoring sentence-length word sequences, the data will be sent to the final stage machine learning system specializing on the pair of words that differ between two word sequences at that word position. Allowing for insertion or deletion errors, one of the two "words" that differ may be a dummy word, indicating that either a word is missing in the word sequence with the dummy word or the corresponding word in the other word sequence is an insertion error.

Each final stage machine learning system in the illustrative embodiment will have a separate acoustic model system, and one or more language model systems. Note that any pair of words selected from two top scoring word sequences must both have good scores from the acoustic knowledge source. Therefore, they will sound similar to each other or, perhaps, even be homophones. The language model learning system assigned to the pair of word identities will be trained on data that distinguishes just this pair of words. That is, there will be a customized machine learning system, with a source of knowledge independent of the acoustics, focused just on determining which of these two similar words is more likely, given the context. Furthermore, the acoustic knowledge source in this final stage machine learning system will be trained just to distinguish any slight difference between the pronunciations of the two words. Thus, these final stage machine learning systems will be capable of a much higher level of performance than any general-purpose system of comparable size and complexity.

Differences in scores between two of the top scoring sentences already takes account of the acoustic and of the language model context both preceding and following any words that are in disagreement. For both to have top scores, they both need to be hypothesizing words that, if not correct, are at least acoustically similar to the correct answer. They both need to be at least reasonably probable given the context of surrounding words. These conditions mean that the components the final machine learning system can be very specialized and precise. For example, the language model only needs to learn to distinguish words that sound alike or very similar. Fortunately, words that sound alike usually only occur in context in which they can be easily distinguished. Otherwise, human listeners would not be able to distinguish them either.

Illustrative Example: Adding an Additional Non-Final Stage to Increase the Number of Final Stage Machine Learning Systems. This illustrative example creates an additional non-final stage of data assignment classifiers 102 to allow the final stage computation to be shared among a larger number of final stage machine learning systems. For example, in recognition of hand-written digits, in some embodiments, such as example 1.b, the first stage data assignment system might merely be a digit classifier, with only ten distinct categories and, therefore, only ten destinations. In this illustrative embodiment, each destination from the output of the last of the previous non-final layers becomes a non-final stage data assignment classifier 102, rather than a final stage machine learning system 104. In one illustrative embodiment, the non-final stage classifier 102 is a decision tree, allowing the number of leaf nodes, and therefore the number of data destinations, to grow exponentially with the depth of the tree. One illustrative embodiment is to initialize each node of the decision tree by choosing an arbitrary pair of examples from the data with different labels. Then initialize the node to be a linear discriminator for those two examples. That is, initialize the decision boundary to be the perpendicular bisector of the line between the two examples.

Once the decision tree has been built, it may be optimized, for example, by using the iterative mutual training as in the illustrative example discussed above.

Illustrative Example: Adding an Additional Non-Final Stage to Improve Performance. In an illustrative example, an additional non-final stage is added to improve the performance of the final stage machine learning systems 104. In this illustrative example, each final stage machine learning system 104a is replaced by two or more final stage machine learning systems 104b and 104c designed to correct some of the errors made by the original single final stage machine learning system 104a.

Consider an example final stage machine learning system 104a and two categories A and B that final machine learning system 104a sometimes misclassifies. There are many ways that two or more machine learning systems can be designed and trained to have a lower error rate on distinguishing A from B than 104a by itself. For example, learning coach could make two copies of machine learning system 104a and then, during training, oversample instances of category A for one copy of 104a and oversample instances of category B for the other copy of 104a. Then an extra non-final stage data assignment system 102 can be created and the copies of final stage machine learning system 104a and the data assignment system 102 can be trained by iterative mutual training. Alternately, or in addition, learning coach 105 could make final machine learning system 104b different from final machine learning system 104c by adding or deleting nodes and arcs or by making some other structural change in final machine learning system 104a.

Many of the techniques discussed in relation to the other illustrative examples can also be used to create an additional non-final stage of data assignment systems.

The machine learning systems within the multi-stage architecture 101, 102, 104 and the learning coach and data management system 105 can be implemented with computer hardware and software. For example, they could be part of an integrated computer system (e.g., a server or network of servers) that has multiple processing CPU cores. One set of cores could execute the program instructions for a machine learning system within a non-final stage 101, 102, another set for a machine learning system within the final stage 104, another set for the learning coach and data management system 105, and so on. The program instructions could be stored in computer memory that is accessible by the processing cores, such as RAM, ROM, processor registers or processor cache, for example. The program instructions could also be stored in computer memory utilized as backup storage for inactive machine learning systems, such as secondary computer memory, such as hard drives. In other embodiments, some or all of the machine learning systems within the multi-stage architecture 101, 102, 104 and the learning coach and data management system 105 could execute on graphical processing unit (GPU) cores or processing cores of an AI accelerator. For example, the cores could be part of a general-purpose GPU (GPGPU) pipeline. GPU cores operate in parallel and, hence, can typically process data more efficiently that a collection of CPU cores, but all the cores execute the same code at one time. Thus, if the machine learning systems within the multi-stage architecture 101, 102, 104 and the learning coach and data management system 105 were implemented with a GPGPU pipeline, the GPU cores would need to take turns executing the code for each system. An AI accelerator is a class of processor designed to accelerate AI tasks, such as training deep networks. AI accelerators often have tens of thousands of cores (e.g., 65,000 cores) and operate on lower-precision arithmetic (e.g., 8-bit precision).

Also, some or all of the machine learning systems within the multi-stage architecture 101, 102, 104 and the learning coach and data management system 105 could be part of a distributed computer system. For example, the computer devices (e.g., servers) that implement the machine learning systems within the multi-stage architecture 101, 102, 104 and/or the learning coach and data management system 105 may be remote from each other and interconnected by data networks, such as a LAN, WAN, the Internet, etc., using suitable wired and/or wireless data communication links Data may be shared between the various systems using suitable data links, such as data buses (preferably high-speed data buses) or network links (e.g., Ethernet).

The software for the various machine learning systems described herein (e.g., machine learning systems within the multi-stage architecture 101, 102, 104 and the learning coach and data management system 105) and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed machine learning recognition system comprising a final stage 104 and at least one non-final stage 101, 102. The final stage comprises N final-stage machine learning classifiers 104*a-f*, wherein N>1, and where each of the N final-stage machine learning classifiers is for classifying a data input to a classification output. Each of at least one non-final-stages comprises one or more machine learning, data assignment classifiers 101, 102*a-d*, that assigns each data input to one or more of, and less than N of, the N final-stage machine learning classifiers.

In various implementations, each of the one or more machine learning, data assignment classifiers 101, 102*a-d* assigns a data input to one and only one of the N final-stage machine learning classifiers. In particular, each of one or more one machine learning, data assignment classifiers 101, 102*a-d* may assign each data input to the one or more of, and less than N of, the N final-stage machine learning classifiers that the machine learning, data assignment classifier determines will classify the data input correctly.

Also, there could be three or more stages, with one final stage and two (first and second) non-final stages 101, 102. In such an embodiment, the first non-final stage 101 may comprise a first machine learning data classifier and the second non-final stage 102 may comprises M second stage machine learning classifiers, where M>1. The first machine learning data classifier of the first non-final stage classifies each data input to one or more of, and less than M of, the M second stage machine learning classifiers of the second non-final stage. In turn, each of the M second stage machine learning classifiers of the second non-final stage classifies each data input to it to one or more of, and less than N of, the N final stage machine learning classifiers of the final stage. Also, the machine learning systems may have different machine learning architectures for each stage. They may even have different machine learning architectures within one stage.

In various embodiments, the machine learning recognition system may further comprise a learning coach machine learning system 105 that distributes data throughout the system based on observations of the internal states of the machine learning systems within the overall system. Also, using machine learning, the learning coach can learn an enhancement to any of N final-stage machine learning classifiers 104 or the non-final stage data assignment classifiers 101, 102, such as an improved hyperparameter or a structural change.

In various implementations, each of non-final stage data assignment classifiers may be trained through supervised training to assign a data input to the one or more N final stage machine learning classifiers that the non-final stage data assignment classifier determines is likely to classify the data input correctly. Also, each of the non-final stage, data assignment classifiers may be trained to perform the same classifications as the N final stage machine learning classifiers.

In yet further implementations, the final stage may have T different classification categories, such that T<N. Each of the N final stage final stage machine learning classifiers may classify a data input to an ordered set of classification categories $<T_1, T_2>$, based on a ranking of classification of the data input to the T different classification categories.

Also, in still other implementations, the non-final stage data assignment classifiers use metadata associated with each data input item to assigns each data input to the N final-stage machine learning classifiers.

In addition, the components of the machine learning recognition system could be geographically distributed. For example, the non-final stage may comprise a plurality P of machine learning, data assignment classifiers where each of the P machine learning, data assignment classifiers is located as a separate physical location. In addition, the N final stage machine learning classifiers may be connected to the P machine learning, data assignment classifiers by a data switching network 110. In various embodiments, the N final stage machine learning classifiers are distributed across two or more sites and each of the two or more sites comprises one or more inactive final stage machine learning classifiers. The N final stage machine learning classifiers are stored in primary computer memory and the inactive final stage machine learning classifiers are stored in secondary computer memory.

In various implementations, the machine learning recognition system comprises a speech recognition system. In such implementations, the non-final stage data assignment classifiers may comprises a phonetic feature classifier, in particular a phonetic-feature-based phoneme recognizer. Alternatively, the non-final stage data assignment classifiers may comprise a decision tree for recognition of syllables or words.

In another general aspect, the present invention is directed to a speech recognition system that comprises an acoustic model machine learning classifier and a contextual model machine learning classifier. Both of the acoustic model machine learning classifier and a contextual model machine learning classifier may comprise multi-stage machine learning systems are described above.

In yet another general aspect, the present invention is directed to a computer system for a machine learning recognition system. The computer system comprises a plurality of servers, where each of the servers comprises a plurality of processing cores. A first set of cores executes one or more programs to implement a final stage comprising N final-stage machine learning classifiers, where N>1, and where each of the N final-stage machine learning classifiers is for classifying a data input to a classification output. A second set of cores executes one or more programs to implement at least one non-final-stage, where each of the at least one non-final stages comprises one or more machine learning, data assignment classifiers that assigns each data input to one or more of, and less than N of, the N final-stage machine learning classifiers. The processing cores may comprise GPU or AI accelerator cores, for example.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A machine learning recognition system comprising:
   a final stage comprising N final-stage machine learning classifiers, wherein N>1, and wherein each of the N final-stage machine learning classifiers is for classifying a data input to a classification output; and
   at least one non-final stage, wherein the at least one non-final stage comprises one or more machine learning, data assignment classifiers that receives each data input and outputs each data input that is input to the at least one non-final stage to a selected set of the N final-stage machine learning classifiers, wherein the one or more machine learning, data assignment classifiers of the at least one non-final stage selects the final-stage machine learning classifiers for the selected set based on a determination by the one or more machine learning, data assignment classifiers of which final-stage machine learning classifiers will classify the data input correctly, wherein the selected set of the N final-stage machine-learning classifiers comprises one or more of, and less than N of, the N final-stage machine learning classifiers, and such that the selected set of the N final-stage machine learning classifiers classify the data input assigned by the at least one non-final stage,
   wherein the one or more machine learning, data assignment classifiers of the at least one non-final stage are trained with training data items, through supervised machine learning, to assign each training data item to the selected set of the N final-stage machine learning classifiers that the one or more machine learning, data assignment classifiers determine will classify the training data item correctly based on a target vector for the training data item, wherein the target vector has a value for each of the N final-stage machine learning classifiers that is dependent on how each of the N final-stage machine learning classifiers classified the training data item, such that the target vector comprises N values.

2. The machine learning recognition system of claim 1, wherein each of the one or more machine learning, data assignment classifiers outputs a data input to one and only one of the N final-stage machine learning classifiers.

3. The machine learning recognition system of claim 1, wherein:
   the at least one non-final stage comprises a first non-final stage and a second non-final stage;
   the first non-final stage comprises a first machine learning data classifier;
   the second non-final stage comprises M second stage machine learning classifiers, where M>1;
   the first machine learning data classifier of the first non-final stage classifies each data input to one or more of, and less than M of, the M second stage machine learning classifiers of the second non-final stage; and
   each of the M second stage machine learning classifiers of the second non-final stage classifies each data input to it to the selected set of the N final-stage machine learning classifiers of the final stage.

4. The machine learning recognition system of claim 3, wherein:
   each of the N final-stage machine learning classifiers has a first machine learning architecture;
   each of the M second stage machine learning classifiers has a second machine learning architecture; and
   the first machine learning architecture of the N final-stage machine learning classifiers is different from the second machine learning architecture of the M second stage machine learning classifiers.

5. The machine learning recognition system of claim 3, wherein at least two of the M second stage machine learning classifiers having different machine learning architectures.

6. The machine learning recognition system of claim 1, wherein at least two of the N final-stage machine learning classifiers having different machine learning architectures.

7. The machine learning recognition system of claim 1, further comprising a learning coach machine learning system that distributes data throughout the final stage and the at least one non-final stage based on observations about internal states of the N final-stage machine learning classifiers and the one or more machine learning, data assignment classifiers.

8. The machine learning recognition system of claim 1, further comprising a learning coach machine learning system that, using machine learning, learns an enhancement to at least one of the N final-stage machine learning classifiers and the one or more machine learning, data assignment classifiers.

9. The machine learning recognition system of claim 1, wherein each of one or more machine learning, data assignment classifiers is trained through supervised training to output a data input to the selected set of the N final-stage machine learning classifiers that the machine learning, data assignment classifier determines is likely to classify the data input correctly.

10. The machine learning recognition system of claim 1, wherein each of the one or more machine learning, data assignment classifiers is trained to perform the same classifications as the N final-stage machine learning classifiers.

11. The machine learning recognition system of claim 1, wherein:
the final stage has T different classification categories, such that T<N;
each of the N final-stage machine learning classifiers classify a data input to an ordered set of classification categories based on ranking of classification of the data input to the T different classification categories.

12. The machine learning recognition system of claim 1, wherein:
metadata are associated with each data input item; and
the one or more machine learning, data assignment classifiers outputs each data input to the selected set of the N final-stage machine learning classifiers based in part on the metadata.

13. The machine learning recognition system of claim 1, wherein:
the non-final stage comprises a plurality P of machine learning, data assignment classifiers;
each of the P machine learning, data assignment classifiers is located at a separate physical location; and
the N final-stage machine learning classifiers are connected to the P machine learning, data assignment classifiers by a data switching network.

14. The machine learning recognition system of claim 13, wherein the data switching network comprises a packet-switched network.

15. The machine learning recognition system of claim 13, wherein:
the N final-stage machine learning classifiers are distributed across two or more geographically distributed sites;
each of the two or more geographically distributed sites comprises one or more inactive final-stage machine learning classifiers;
the N final-stage machine learning classifiers are stored in primary computer memory; and
the inactive final-stage machine learning classifiers are stored in secondary computer memory.

16. The machine learning recognition system of claim 1, wherein the machine learning recognition system comprises a speech recognition system.

17. The machine learning recognition system of claim 16, wherein the one or more machine learning, data assignment classifiers of the at least one non-final stage comprises a phonetic feature classifier.

18. The machine learning recognition system of claim 17, wherein the phonetic feature classifier comprises a multi-layer neural network trained as a phonetic-feature-based phoneme recognizer.

19. The machine learning recognition system of claim 16, wherein the one or more machine learning, data assignment classifiers of the at least one non-final stage comprises a decision tree for recognition of syllables or words.

20. The machine learning recognition system of claim 1, wherein the N final-stage machine learning classifiers are image classifiers.

21. The machine learning recognition system of claim 1, wherein the N final-stage machine learning classifiers are speech recognition classifiers.

22. The machine learning recognition system of claim 1, wherein the target vector has a value of 1 for final-stage machine learning classifiers that the data assignment classifier determines will have a correct answer and a value of 0 for all other final-stage machine learning classifiers.

23. The machine learning recognition system of claim 1, wherein the target vector has a value of 1 for the final-stage machine learning classifier with a greatest comparative score and a value of 0 for all other final-stage machine learning classifiers.

24. A speech recognition system comprising:
an acoustic model machine learning classifier, wherein the acoustic model machine learning classifier comprises:
a final stage comprising $N_1$ final-stage machine learning classifiers, wherein $N_1>1$, and
wherein each of the $N_1$ final-stage machine learning classifiers is for classifying a data input to a classification output; and
at least one non-final stage, wherein the at least one non-final stages comprises one or more machine learning, data assignment classifiers that receives each data input to the acoustic model machine learning classifier and outputs each data input that is input to the at least one non-final stage of the acoustic model machine learning classifier to a selected set of the $N_1$ final-stage machine learning classifiers, wherein the one or more machine learning, data assignment classifier determines of the at least one non-final stage of the acoustic model machine learning classifier selects the final-stage machine learning classifiers of the acoustic model machine learning classifier for the selected set based on a determination by the one or more machine learning, data assignment classifiers of which final-stage machine learning classifiers will classify the data input correctly, wherein the selected set of the $N_1$ final-stage machine learning classifiers comprises one or more of, and less than $N_1$ of, the $N_1$ final-stage machine learning classifiers of the acoustic model machine learning classifier, and such that the selected set of the $N_1$ final-stage machine learning classifiers classify the data input assigned by the at least one non-final stage of the acoustic model machine learning classifier,
wherein the one or more machine learning, data assignment classifiers of the at least one non-final stage of the acoustic model machine learning system are trained with training data items, through supervised machine learning, to assign each training data item to the selected of set of the $N_1$ final-stage machine learning classifiers that the one or more machine learning, data assignment classifiers determine will classify the training data item correctly based on a target vector for the training data item, wherein the target vector has a value for each of the $N_1$ final-stage machine learning classifiers that is dependent on how each of the $N_1$ final-stage machine learning classifiers classified the training data item, such that the target vector comprises $N_1$ values; and
a contextual model machine learning classifier, wherein the contextual model machine learning classifier comprises:
a final stage comprising $N_2$ final-stage machine learning classifiers, wherein $N_2>1$, and
wherein each of the $N_2$ final-stage machine learning classifiers is for classifying a data input to a classification output; and
at least one non-final stage, wherein the at least one non-final stage comprises one or more machine learning, data assignment classifiers that receives each data input to the contextual model machine learning classifier and outputs each data input that is input to the at least one non-final stage of the contextual model machine learning classifier to a selected set of the $N_2$ final-stage machine learning classifiers, wherein the one or more machine learning, data assignment classifiers of the at least one non-final stage of the contextual model machine learning classifier selects the final-state machine learning classifiers of the contextual model machine learning classifier for the selected set based on a determination by the one or more machine learning, data assignment classifiers of which final-stage machine learning classifiers will classify the data input correctly, wherein the selected set of the $N_2$ final-stage machine learning classifiers comprises one or more of, and less than $N_2$ of, the $N_2$ final-stage machine learning classifiers of the contextual model machine learning classifier, and such that the selected set of the $N_2$ final-stage machine learning classifiers classify the data input assigned by the at least one non-final stage of the contextual model machine learning classifier, wherein the one or more machine learning, data assignment classifiers of the at least one non-final stage of the contextual model machine learning system are trained with training data items, through supervised machine learning, to assign each training data item to the selected of set of the $N_2$ final-stage machine learning classifiers that the one or more machine learning, data assignment classifiers determine will classify the training data item correctly based on a target vector for the training data item, wherein the target vector has a value for each of the $N_2$ final-stage machine learning classifiers that is dependent on how each of the $N_2$ final-stage machine learning classifiers classified the training data item, such that the target vector comprises $N_2$ values.

25. The speech recognition system of claim 24, wherein the data inputs are spectrograms.

26. The speech recognition system of claim 24, wherein the data inputs are phonemes.

27. A computer system for a machine learning classifier, the computer system comprising a plurality of servers, wherein each of the servers comprises a plurality of processing cores, such that:

a first set of cores executes one or more programs to implement a final stage comprising N final-stage machine learning classifiers, wherein N>1, and wherein each of the N final-stage machine learning classifiers is for classifying a data input to a classification output; and a second set of cores executes one or more programs to implement at least one non-final stage, wherein the at least one non-final stage comprises one or more machine learning, data assignment classifiers that receives each data input and outputs each data input that is input to the at least one non-final stage machine learning classifiers to a selected set of the N final stage machine learning classifiers, wherein the one or more machine learning, data assignment classifiers of the at least one non-final stage selects the final-stage machine learning classifiers for the selected set based on a determination by the one or more machine learning, data assignment classifiers of which final-state machine learning classifiers will classify the data input correctly, wherein the select set comprises one or more of, and less than N of, the N final-stage machine learning classifiers, and such that the selected set of the N final-stage machine learning classifiers classify the data input assigned by the at least one non-final stage, wherein the one or more machine learning, data assignment classifiers of the at least one non-final stage are trained with training data items, through supervised machine learning, to assign each training data item to the selected of set of the N final-stage machine learning classifiers that the one or more machine learning, data assignment classifiers determine will classify the training data item correctly based on a target vector for the training data item, wherein the target vector has a value for each of the N final-stage machine learning classifiers that is dependent on how each of the N final-stage machine learning classifiers classified the training data item, such that the target vector comprises N values.

28. The computer system of claim 27, wherein the processing cores comprise GPU cores.

29. The computer system of claim 27, wherein the processing cores comprise processing cores of an AI accelerator.

* * * * *